United States Patent
Tseng et al.

(10) Patent No.: US 8,482,701 B2
(45) Date of Patent: Jul. 9, 2013

(54) POLYMER STABILIZATION ALIGNMENT LIQUID CRYSTAL DISPLAY PANEL AND LIQUID CRYSTAL DISPLAY PANEL

(75) Inventors: Chin-An Tseng, Hsin-Chu (TW); Chia-Yu Lee, Hsin-Chu (TW); Yen-Heng Huang, Hsin-Chu (TW); Wen-Hsien Tseng, Hsin-Chu (TW); Chia-Hui Pai, Hsin-Chu (TW); Chung-Kai Chen, Hsin-Chu (TW); Wei-Yuan Cheng, Hsin-Chu (TW); Ting-Yi Cho, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 404 days.

(21) Appl. No.: 12/825,385

(22) Filed: Jun. 29, 2010

(65) Prior Publication Data

US 2011/0149224 A1 Jun. 23, 2011

(30) Foreign Application Priority Data

Dec. 22, 2009 (TW) ................................ 98144291 A (51) Int. Cl.
*G02F 1/1333* (2006.01)
*G02F 1/1343* (2006.01)

(52) U.S. Cl.
USPC ............................. 349/110; 349/144; 349/129

(58) Field of Classification Search
USPC .................................. 349/142–144, 110, 129
See application file for complete search history.

(56) References Cited

U.S. PATENT DOCUMENTS

| | | | |
|---|---|---|---|
| 5,835,169 A | 11/1998 | Kwon et al. | |
| 5,838,399 A | 11/1998 | Someya et al. | |
| 6,822,704 B2 | 11/2004 | Sakamoto | |
| 2003/0067579 A1 | 4/2003 | Inoue | |
| 2003/0071952 A1* | 4/2003 | Yoshida et al. | 349/141 |
| 2007/0290227 A1 | 12/2007 | Liang et al. | |
| 2008/0007681 A1 | 1/2008 | Chen et al. | |
| 2008/0225218 A1* | 9/2008 | Lee et al. | 349/144 |
| 2009/0310075 A1* | 12/2009 | Kim | 349/144 |
| 2010/0253899 A1 | 10/2010 | Lee et al. | |

FOREIGN PATENT DOCUMENTS

CN 101266375 9/2008

* cited by examiner

*Primary Examiner* — Nathanael R Briggs
(74) *Attorney, Agent, or Firm* — WPAT, PC; Justin King (57) ABSTRACT

The present invention provides a polymer stabilization alignment liquid crystal display panel having a plurality of pixel regions. Each pixel region includes a main region and a sub region, and a first pixel electrode and a second pixel electrode correspond to the main region and the sub region respectively. Each first pixel electrode is separated from the adjacent data line and thereby forming a gap therebetween. Each second pixel electrode partially overlaps the adjacent data line. In addition, each second pixel electrode includes a plurality of branches, and at least one edge of the branches may be parallel to the data lines. Accordingly, the present invention not only can increase the aperture ratio, but also well control the liquid crystal molecules located near the data lines. Therefore, the display quality of the liquid crystal display panel can be improved.

26 Claims, 8 Drawing Sheets

POLYMER STABILIZATION ALIGNMENT LIQUID CRYSTAL DISPLAY PANEL AND LIQUID CRYSTAL DISPLAY PANEL

This application claims the right of priority based on Taiwan Patent Application No. 098144291 entitled "Polymer Stabilization Alignment Liquid Crystal Display Panel and Liquid Crystal Display Panel", filed on Dec. 22, 2009, which is incorporated herein by reference and assigned to the assignee herein.

BACKGROUND

1. Technical Field

The present invention relates to a polymer stabilization alignment (PSA) liquid crystal display panel, and more particularly to a pixel structure of the PSA liquid crystal display panel.

2. Description of the Related Art

With the development of flat panel display technique, flat panel displays, such as liquid crystal displays that have advantages of light weight, small size and low power consumption are becoming more and more popular. However, under a circumstance that a pretilt angle of the liquid crystal is not set, when liquid crystal is rotated, the liquid crystal may irregularly rotate left or right to form a disordered arrangement, and thus a contrast ratio of the liquid crystal display is severely reduced. In order to control the arrangement of the liquid crystal, an alignment film is disposed on an inner side of a substrate plate in a process of making the liquid crystal display. Generally, a rubbing method is widely adopted to form the alignment film. In the rubbing method, a polymer resin film, such as polyimide resin film is rubbed by fabrics or the like along a single direction, thereby enabling the polyimide resin molecules to align in desired directions. However, the alignment film made by the rubbing method has some disadvantages, such as being polluted by impurities, reducing output due to static electricity, and reducing contrast ratio due to the contact while rubbing.

In order to solve above-mentioned problems, various un-rubbing methods that might form an alignment film have emerged, wherein a polymer stabilization alignment method is widely applied for advantages of simple process, low contact pollution, and little light leakage. In the polymer stabilization alignment method, a reactant monomer is mixed into the liquid crystal, and a color filter (CF) substrate and a thin film transistor (TFT) array substrate are positioned on opposite sides of the liquid crystal and fixed together by curing adhesives. Because pixel electrodes of the liquid crystal display have a plurality of slits formed therebetween and aligned in predetermined directions, when a voltage is applied on upside and downside of the liquid crystal, the liquid crystal molecules can be aligned at pretilt angles. In addition, after the reactant monomer is solidified by ultraviolet (UV) curing, a stabilization alignment polymer film having a fixed pretilt angle is formed on an inner side of the CF substrate and/or TFT array substrate.

However, according to a test result of Multi-domain Vertical Alignment (MVA) liquid crystal display panel, an aperture ratio and a brightness of a traditional MVA liquid crystal display panel still remain to be improved., and how to develop along directions of high contrast ratio, little color shift, high luminance, rapid reaction and wide visual angle of the liquid crystal display is still a big subject.

BRIEF SUMMARY

The present invention provides a polymer stabilization alignment liquid crystal display panel and a liquid crystal display panel that may solve one or more of the above-mentioned disadvantages.

An embodiment of the present invention provides a polymer stabilization alignment liquid crystal display panel, which includes a first substrate plate, a plurality of gate lines, a plurality of data lines, a dielectric layer, a plurality of first pixel electrodes, a plurality of second pixel electrodes, a stabilization alignment polymer film, a second substrate plate, and a liquid crystal layer. The gate lines and the data lines are disposed on the first substrate plate. The dielectric layer is positioned on the gate lines and the data lines. The data lines are substantially perpendicular to the gate lines. The gate lines and the data lines cooperatively define a plurality of pixel regions, and each pixel region includes at least a main display region and a sub display region. Each first pixel electrode is positioned in each main display region and on the dielectric layer. Each first pixel electrode electrically connects to the corresponding gate line and the data line, and each first pixel electrode is separated from the adjacent data line and thereby forming a gap therebetween. Each second pixel electrode is positioned in each sub display region and on the dielectric layer. Each second pixel electrode electrically connects to the corresponding gate line and the data line, and each second pixel electrode partially overlaps the adjacent data line. The stabilization alignment polymer film covers the plurality of first pixel electrodes and the plurality of second pixel electrodes. The second substrate plate is positioned opposite to the first substrate plate. The liquid crystal layer is positioned between the first substrate plate and the second substrate plate.

In an embodiment of the present invention, a gap between each first pixel electrode and the adjacent data line is substantially in a range from 1 micron to 6 microns. In an embodiment of the present invention, a ratio of the above gap to the width of each data line is substantially in a range from 0.01 to 1. In an embodiment of the present invention, an overlap width of each data line and one of the adjacent second pixel electrodes is substantially in a range from 1.5 microns to 8 microns. In an embodiment of the present invention, a ratio of above overlap width to the width of each data line is substantially in a range from 0.01 to 1. In an embodiment of the present invention, each second pixel electrode may include a plurality of branches, and at least one edge of the branches may be parallel to the data lines.

Another embodiment of the present invention provides a liquid crystal display panel, which includes a first substrate plate, a plurality of gate lines, a plurality of data lines, a dielectric layer, a plurality of first pixel electrodes, a plurality of second pixel electrodes, a second substrate plate, and a liquid crystal layer. The gate lines and the data lines are disposed on the first substrate plate. The dielectric layer is positioned on the gate lines and the data lines. The data lines are substantially perpendicular to the gate lines. The gate lines and the data lines cooperatively define a plurality of pixel regions, and each pixel region includes at least a main display region and a sub display region. Each first pixel electrode is positioned in each main display region and on the dielectric layer. Each first pixel electrode electrically connects to the corresponding gate line and the data line, and each first pixel electrode is separated from the adjacent data line and thereby forming a gap therebetween. Each second pixel electrode is positioned in each sub display region and on the dielectric layer. Each second pixel electrode electrically connects to the corresponding gate line and the data line, and each second pixel electrode partially overlaps the adjacent data line. The second substrate plate is positioned opposite to the first substrate plate. The liquid crystal layer is positioned between the first substrate plate and the second substrate plate.

Because each first pixel electrode of the present invention is separated from the adjacent data line, and each second pixel electrode of the present invention partially overlaps the adjacent data line. The present invention not only can control the liquid crystal molecules located near the data lines well, but also increase the aperture ratio. Therefore, the display effect of the liquid crystal display panel can be improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings and various exemplary embodiments to describe the present polymer stabilization alignment liquid crystal display panel and liquid crystal display panel in detail. The embodiments provided in the detailed description should not unduly limit the scope of the claims. The description of every member should not limit the member to a specific practice mode and position. Any practice modes recombined by members and methods producing equality effects, should be covered by the scope of the present invention.

Figure 1A:
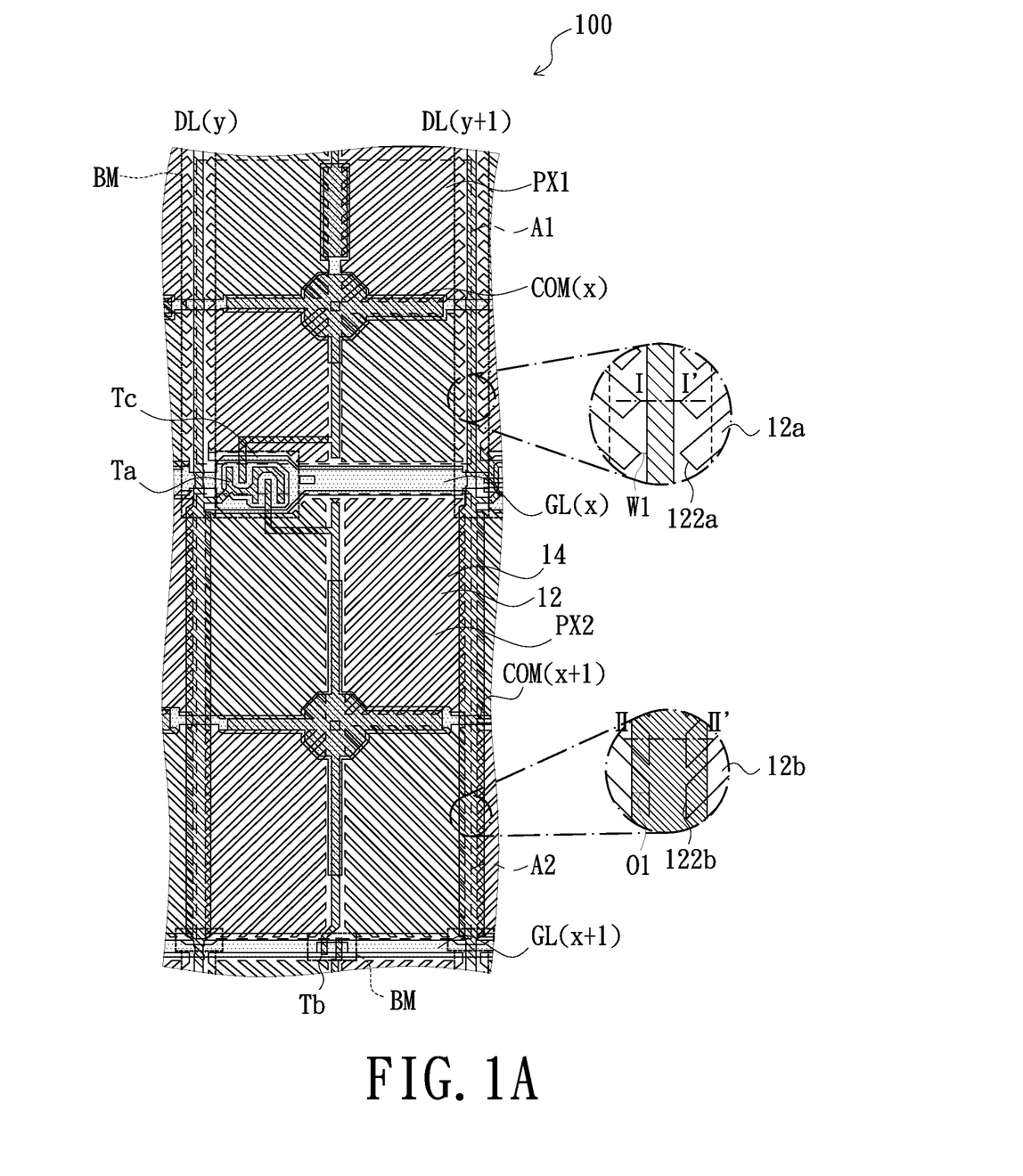
FIGS. 1A and 1B are top plan schematic views of a liquid crystal display panel according to a first embodiment of the present invention.
Figure 2A:
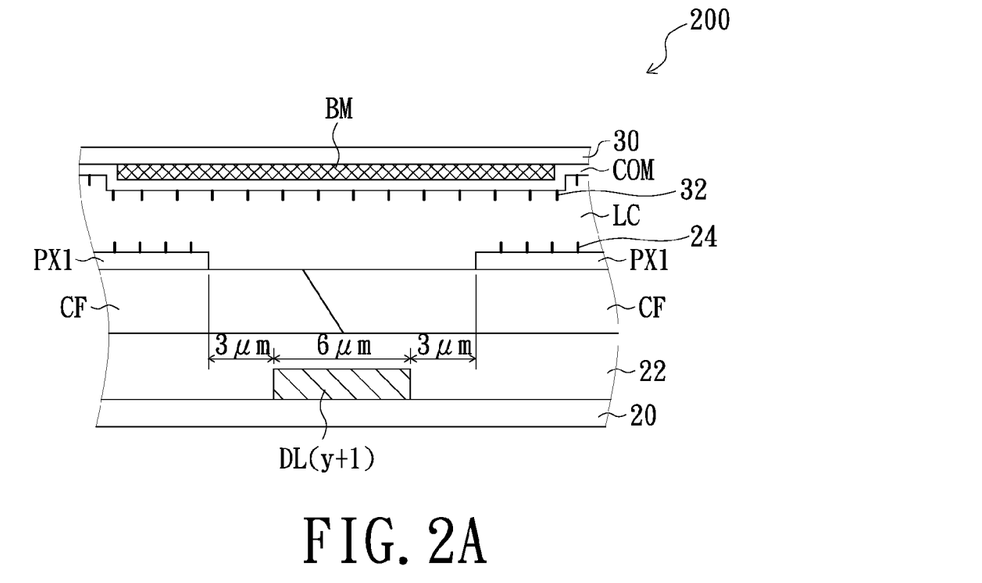
FIGS. 2A and 2B are cross-sectional schematic views of the liquid crystal display panel of FIG. 1A, taken along lines I-I' and II-II' respectively.
Figure 2B:
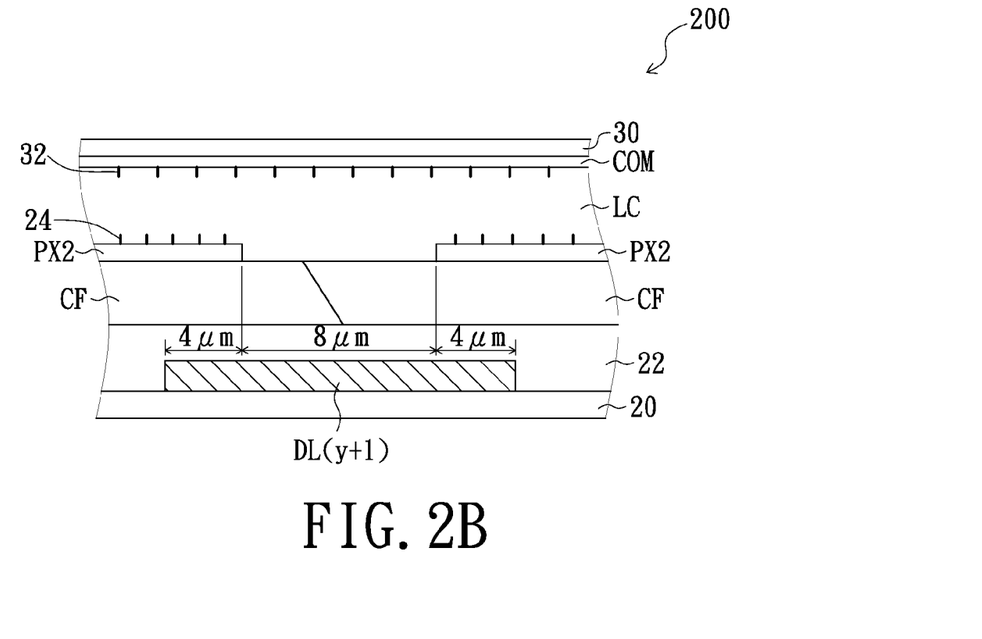

Embodiments:

FIG. 1A is a top plan schematic view of a liquid crystal display panel according to a first embodiment of the present invention, FIGS. 2A and 2B are cross-sectional schematic views of the liquid crystal display panel of FIG. 1A, taken along lines I-I' and II-II' respectively. Referring to FIGS. 1A, 2A and 2B, a liquid crystal display panel 200 of the present invention may be any types of liquid crystal display panels, and preferably is a polymer stabilization alignment (PSA) liquid crystal display panel. FIG. 1A just shows a single pixel structure 100 for description, and actually, the liquid crystal display panel 200 may include a plurality of pixel structures 100 arranged in array. It should be noted that, the pixel structure 100 may be either a sub-pixel or a whole pixel directly. If the pixel structure 100 is a sub-pixel, a pixel may include a plurality of the pixel structures 100. The pixel structures 100 may be, but are not limited to a red sub-pixel, green sub-pixel, a blue sub-pixel, a white sub-pixel and so on.

As shown in FIGS. 1A, 2A and 2B, the pixel structure 100 includes two gate lines (also can be referred to as scan lines) GL(x) and GL(x+1), two data lines (also can be referred to as signal lines) DL(y) and DL(y+1), two common electrodes COM(x) and COM(x+1), a dielectric layer 22, a color filter CF, a first pixel electrode PX1, a second pixel electrode PX2, transistors Ta, Tc and Tb, stabilization alignment polymer films 24 and 32, a substrate plate 30, and a liquid crystal layer LC, which are all formed on a base substrate 20. This embodiment takes, but not limited to the display panel with a color filter incorporated in transistors array substrate (COA) for example to describe the present invention.

As shown in FIG. 1A, the data lines DL(y) and DL(y+1) are substantially perpendicular to the gate lines GL(x) and GL(x+1), but the present invention is not limited as such. The gate lines GL(x) and GL(x+1) and the data lines DL(y) and DL(y+1) may define a plurality of pixel regions, and each pixel region includes at least a main display region A1 and a sub display region A2. The first pixel electrode PX1 and the second pixel electrode PX2 are respectively disposed in the main display region A1 and the sub display region A2. Generally, an operating voltage of the main display region A1 is larger than that of the sub display region A2. In other words, the maximal operating voltage applied on the first pixel electrode PX1 is larger than that applied on the second pixel electrode PX2.

The transistors Ta and Tc may be switch transistors. Gates of the transistors Ta and Tc may be electrically connected to the gate line GL(x). Sources of the transistors Ta and Tc may be electrically connected to the data line DL(y). A drain of the transistor Ta may be electrically connected to the first pixel electrode PX1, and a drain of the transistor Tc may be electrically connected to the second pixel electrode PX2. A gate of the transistor Tb may be electrically connected to the gate line GL(x+1). A source of the transistor Tb may be electrically connected to the drain of the transistor Tc directly. In other words, the source of the transistor Tb and the drain of the transistor Tc use a common metal block. A drain of the transistor Tb is electrically coupled with the first pixel electrode PX1. The common electrodes COM(x) and COM(x+1) are substantially perpendicular to the data lines DL(y) and DL(y+1), and may include a plurality of branches. The common electrodes COM(x) and COM(x+1) may be respectively coupled with the first pixel electrode PX1 and the second pixel electrode PX2 to form capacitances.

As shown in FIGS. 2A and 2B, the dielectric layer 22 and the color filter CF may be positioned on the data lines DL(y) and DL(y+1) and the gate lines GL(x) and GL(x+1). The first pixel electrode PX1 and the second pixel electrode PX2 may be positioned on the dielectric layer 22 and the color filter CF. The dielectric layer 22 of this embodiment includes transparent organic materials, and the color filter CF may be used as a dielectric layer by itself The substrate plate 30 is positioned opposite to the base substrate 20, and the liquid crystal layer LC is positioned between the base substrate 20 and the substrate plate 30. The stabilization alignment polymer film 24 may cover the first pixel electrode PX1 and the second pixel electrode PX2. The stabilization alignment polymer film 32 may cover the substrate plate 30 and a black matrix BM. In other words, the stabilization alignment polymer film 24 is positioned between the base substrate 20 and the liquid crystal layer LC, and the stabilization alignment polymer film 32 is positioned between the substrate plate 30 and the liquid crystal layer LC.

In a process of fabrication of the stabilization alignment polymer films 24 and 32, a reactant monomer is first mixed into the liquid crystal material, and a color filter (CF) substrate and a thin film transistor (TFT) array substrate are then positioned on opposite sides of the liquid crystal and fixed together by curing adhesives. Because the first pixel electrode PX1 and the second pixel electrode PX2 both have a plurality of slits 14 aligned in predetermined directions, when a voltage, such as an alternating current (AC) voltage, is applied on upside and downside electrodes of the liquid crystal layer LC, the liquid crystal molecules and the reactant monomer can be aligned at pretilt angles. Moreover, after the reactant monomer is solidified by ultraviolet curing, the stabilization alignment polymer films 24 and 32 having fixed pretilt angles are formed on inner sides of the CF substrate and/or TFT array substrate. FIGS. 2A and 2B are just schematic views, the actual directions and degrees of the pretilt angles of the stabilization alignment polymer films 24 and 32 may be varied according to a design requirement of every embodiment.

Referring to FIG. 1A again, the first pixel electrode PX1 has a larger operating voltage and is easily to affect an electric field around the first pixel electrode PX1. Therefore, the first pixel electrode PX1 of the present embodiment can be separated from the adjacent data lines DL(y) and DL(y+1) and thereby forming a gap W1 therebetween. In addition, a black matrix BM can be disposed between the first pixel electrode PX1 and the adjacent first pixel electrode PX1 to shield clearances of the pixel structure 100, and thus avoiding the phenomenon of edge light leakages. On the other hand, the second pixel electrode PX2 of the present embodiment may partially overlap the adjacent data lines DL(y) and DL(y+1) and thereby forming an overlap width O1. In addition, the second pixel electrode PX2 and the adjacent second pixel electrode PX2 may not dispose a black matrix BM therebetween, thus aperture ratios of pixels can be increased.

According to experiment of an embodiment of the present invention, in order to increase the aperture ratio and effectively control the directions of the liquid crystal molecules, the gap W1 between each first pixel electrode PX1 and the adjacent data lines DL(y) and DL(y+1) can be in a range from 1 micron to 6 microns. For example, the gap W1 shown in FIG. 2A is, but not limited to 3 microns. Alternatively, a ratio of the above gap W1 to the width of each data line DL(y) or DL(y+1) can be in a range from 0.01 to 1. On the other hand, each data line DL(y) or DL(y+1) adjacent to the second pixel electrode PX2 are wider, and the overlap width O1 of each data line DL(y) or DL(y+1) and one of the adjacent second pixel electrodes PX2 can be in a range from 1.5 microns to 8 microns. For example, two second pixel electrodes PX2 shown in FIG. 2B are respectively extended about 4 microns inwards from opposite sides of the adjacent data line DL(y+1), thus covering about 8 microns width of the data line DL(y+1). Alternatively, a ratio of overlap width O1 to the width of each data line DL(y) or DL(y+1) can be in a range from 0.01 to 1.

Figure 1B:
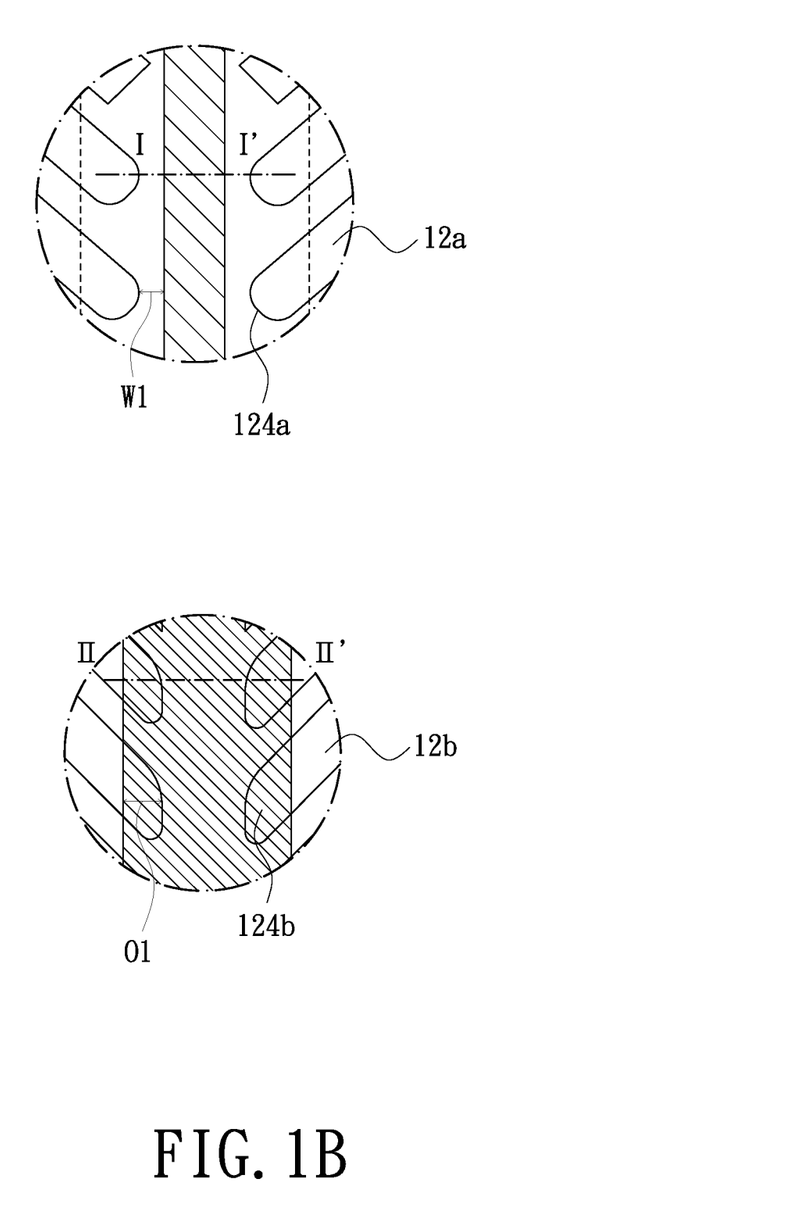

The first pixel electrode PX1 and the second pixel electrode PX2 both include a plurality of branches 12, and every two adjacent branches 12 define a slits 14 therebetween, without pixel electrode materials. The first pixel electrode PX1 has a plurality of branches 12a. Each branch 12a of the first pixel electrode PX1 has an edge 122a. The second pixel electrode PX2 has a plurality of branches 12b. Each branch 12b of the second pixel electrode PX2 has an edge 122b. This pixel electrode structure is favorable to solve a problem of color cast of different visual angles. It should be noted that, according to an experiment of the present invention, at least one edge 122b of the branches 12b of the second pixel electrode PX2, preferably one or more edges 122b overlapping the adjacent data lines DL(y) or DL(y+1), can be substantially parallel to the data lines DL(y) and DL(y+1), thereby providing a better control effect of the liquid crystal molecules. In this embodiment, the edges 122a of the branches 12a of the first pixel electrode PX1 may not parallel to the data lines DL(y) and DL(y+1), but inclined at an angle about 45 degrees. In other embodiments, the shapes of the first pixel electrode PX1 and the second pixel electrode PX2 may be changed according to requirements, for example, the edges 122a of the branches 12a of the first pixel electrode PX1 may be parallel to the data lines DL(y) and DL(y+1). The corners 124a, 124b of the branches 12a, 12b of the first pixel electrode PX1 and the second pixel electrode PX2 may be substantially round, but not form a sharp angle with a right angle, an acute angle or an obtuse angle, as shown in FIG. 1B.

The configuration of the pixel structure 100 is not limited to FIGS. 1A to 2B, in other embodiments, the present invention may be applied on a display panel with a black matrix incorporated in the transistors array substrate (BOA). Two adjacent pixel structures may dispose at least two data lines therebetween, for example, the pixel structure of the liquid crystal display panel may be configured as a structure of two data lines collocated with a gate line (2D1G). Referring to FIGS. 3A to 5B, FIGS. 3A, 4A and 5A are cross-sectional schematic views of junction portions of first pixels and data lines of liquid crystal display panels, respectively according to a second, a third and a fourth embodiments of the present invention. FIGS. 3B, 4B and 5B are cross-sectional schematic views of junction portions of second pixels and data lines of liquid crystal display panels, respectively according to the second, the third and the fourth embodiments of the present invention.

Figure 3A:
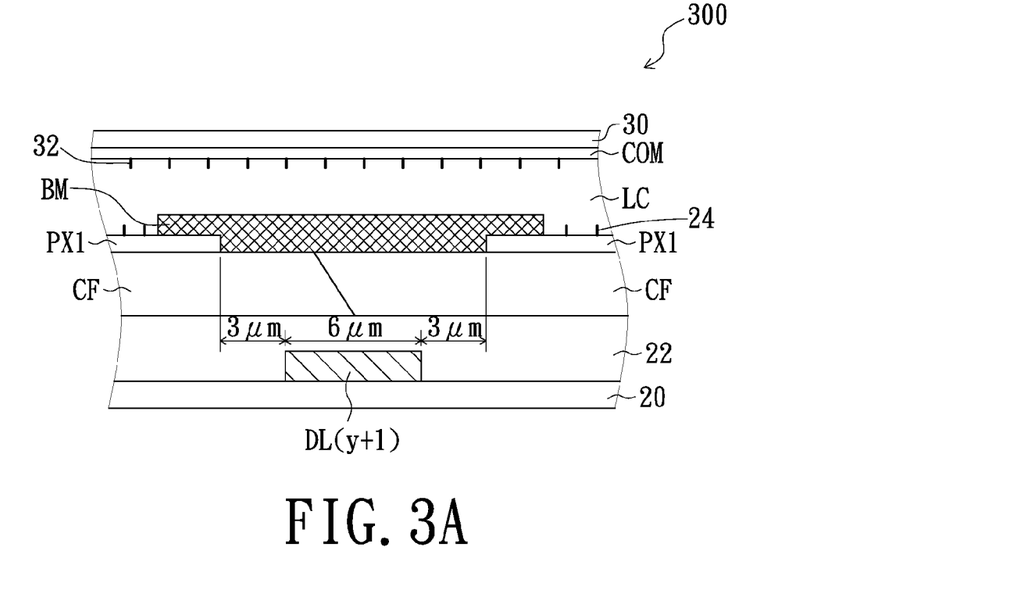
FIG. 3A is a cross-sectional schematic view of a junction portion of a first pixel and a data line of a liquid crystal display panel, according to a second embodiment of the present invention.
Figure 3B:
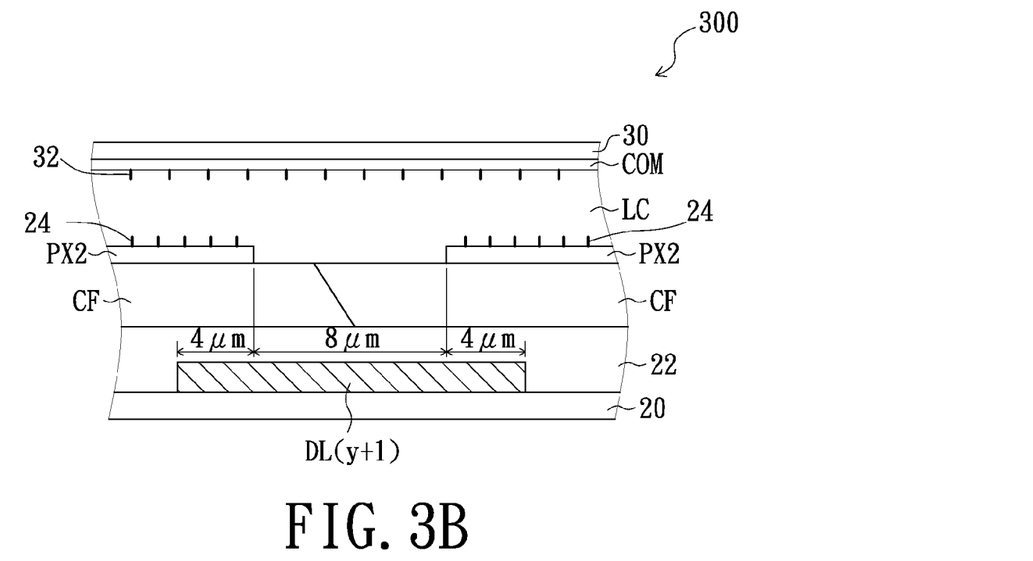
FIG. 3B is a cross-sectional schematic view of a junction portion of a second pixel and a data line of the liquid crystal display panel, according to the second embodiment of the present invention.

As shown in FIGS. 3A and 3B, the difference between the second embodiment and the first embodiment is that a liquid crystal display panel 300 of the second embodiment is a BOA type display panel. A color filter CF and a black matrix BM of the liquid crystal display panel 300 are both directly formed on an inner side of a base substrate 20. In other words, the color filter CF, the black matrix BM, a first pixel electrode PX1, a data line DL(y+1), a gate lines GL(X) and GL(x+1) (not shown in FIGS. 3A and 3B), and transistors Ta, Tc and Tb (not shown in FIGS. 3A and 3B) are all disposed on the same base substrate 20.

Figure 4A:
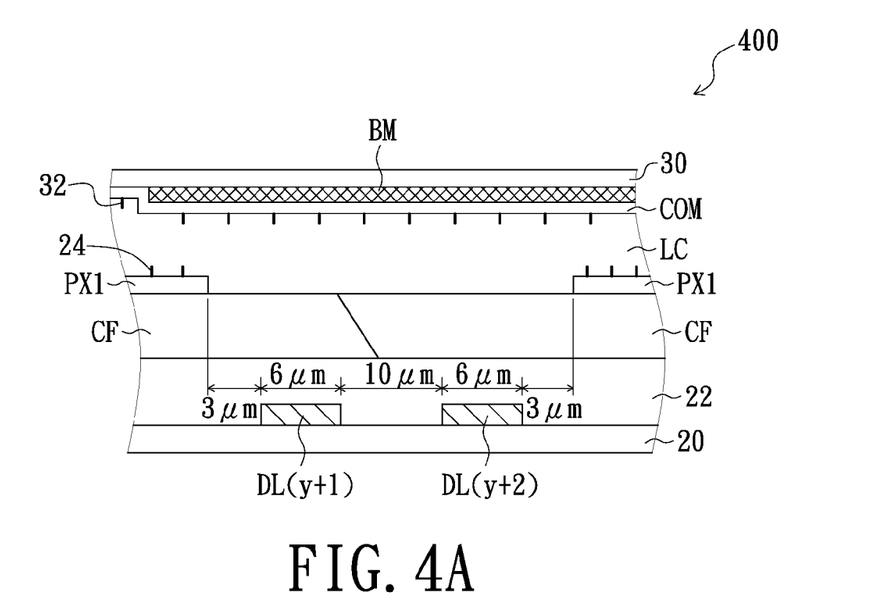
FIG. 4A is a cross-sectional schematic view of a junction portion of a first pixel and a data line of a liquid crystal display panel, according to a third embodiment of the present invention.
Figure 4B:
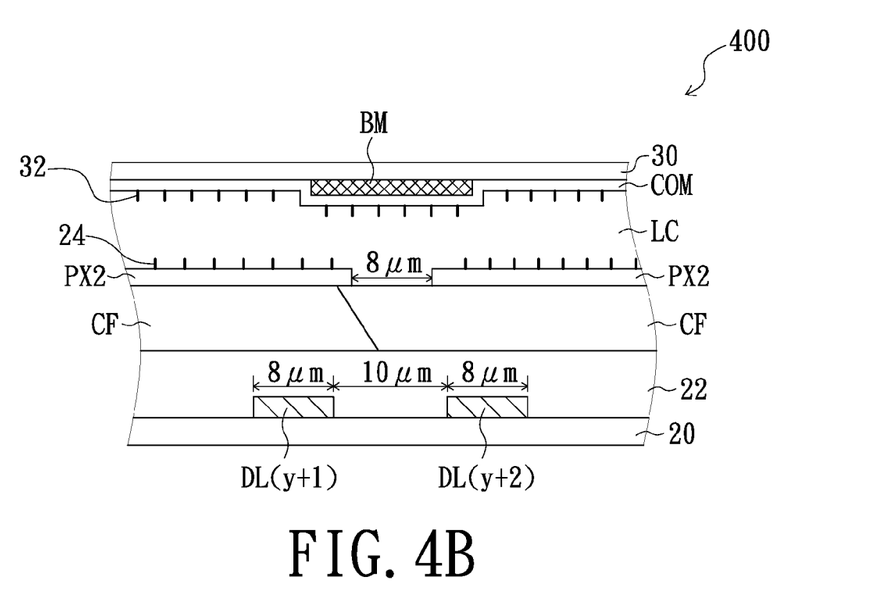
FIG. 4B is a cross-sectional schematic view of a junction portion of a second pixel and a data line of the liquid crystal display panel, according to the third embodiment of the present invention.

As shown in FIGS. 4A and 4B, the difference between the third embodiment and the first embodiment is that a liquid crystal display panel 400 of the third embodiment may include at least two data lines DL(y+1) and DL(y+2) disposed between adjacent pixel structures. As such, two transistors Ta and Tc in the same pixel structure, which are used for respectively control a main display region A1 and a sub display region A2, may be electrically connected to different data lines DL(y) and DL(y+1). In this embodiment, the first pixel electrode PX1 may be separated from the adjacent data lines DL(y+1) and DL(y+2) and thereby forming a gap W1 therebetween, the gap W1 may be, but not limited to 3 microns as shown in FIG. 4A. The second pixel electrode PX2 may partially overlap the adjacent data lines DL(y+1) and DL(y+2) and thereby forming an overlap width O1. For example, two second pixel electrodes PX2 shown in FIG. 4B are respectively extended about 9 microns inwards from edges of adjacent data lines DL(y+1) and DL(y+2), thus completely covering the data line DL(y+1) with about 8 microns wide and the data line DL(y+2) with about 8 microns wide.

Figure 5A:
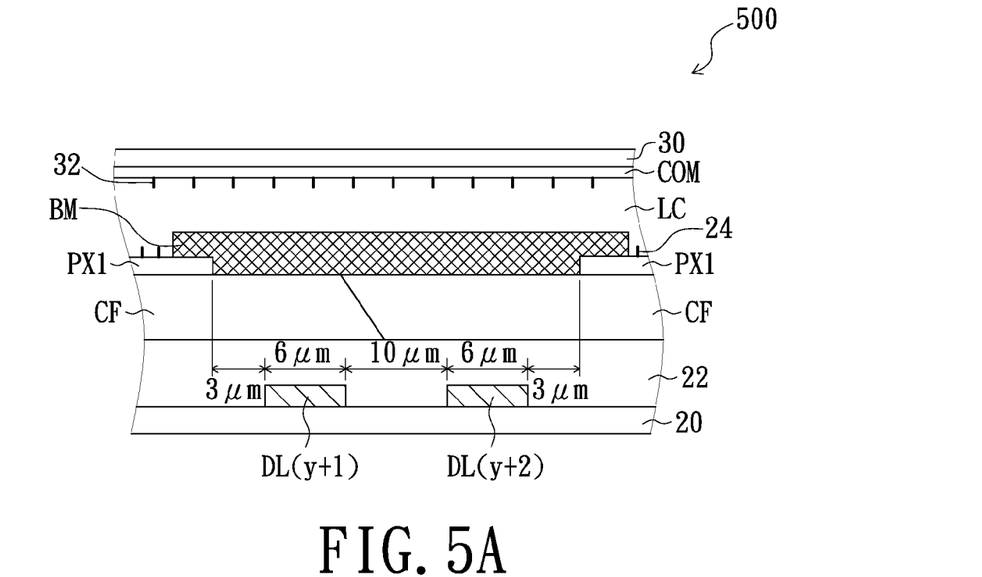
FIG. 5A is a cross-sectional schematic view of a junction portion of a first pixel and a data line of a liquid crystal display panel, according to a fourth embodiment of the present invention.
Figure 5B:
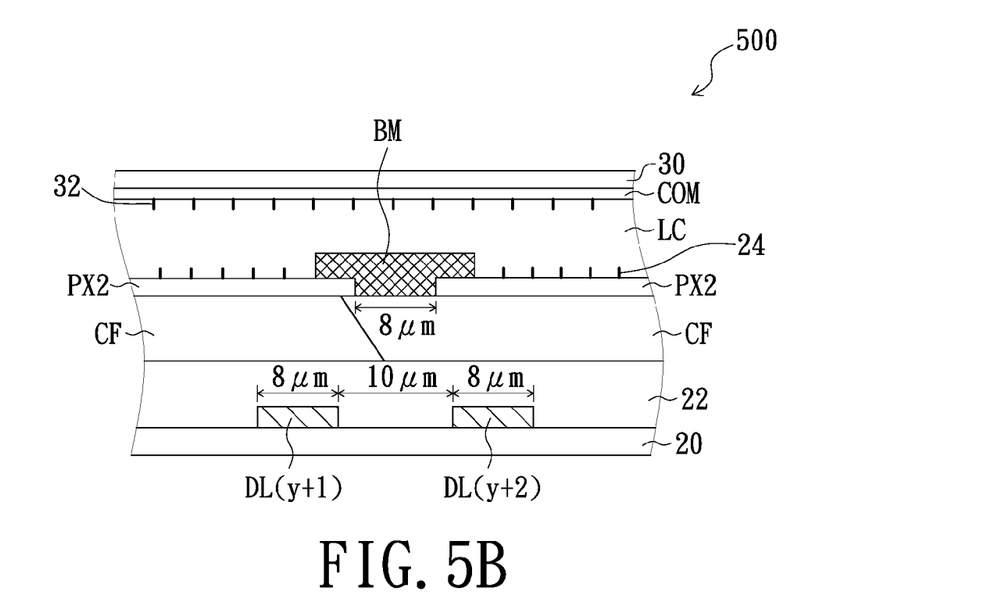
FIG. 5B is a cross-sectional schematic view of a junction portion of a second pixel and a data line of the liquid crystal display panel, according to the fourth embodiment of the present invention.

As shown in FIGS. 5A and 5B, the difference between the fourth embodiment and the third embodiment is that a liquid crystal display panel 500 of the fourth embodiment is a BOA-type display panel. A color filter CF and a black matrix BM of the liquid crystal display panel 500 are both directly formed on an inner side of a base substrate 20.

Figure 8:
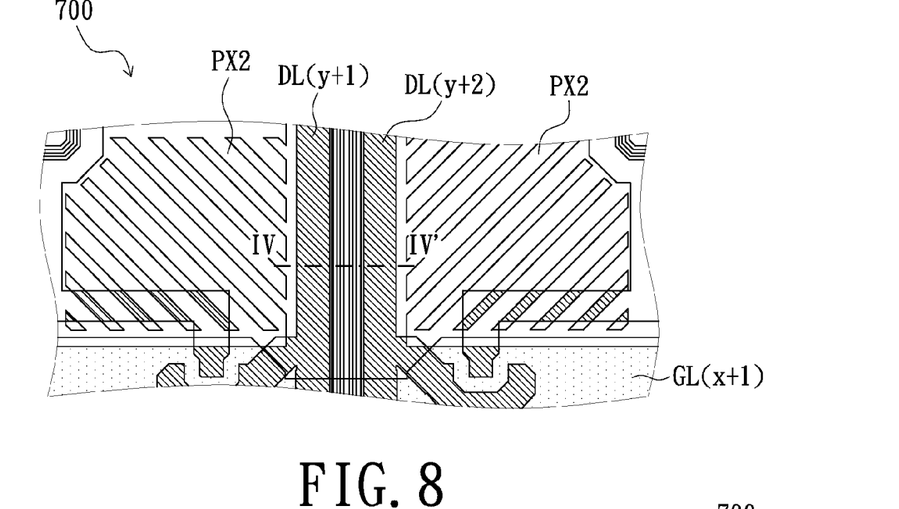
FIG. 8 is a distribution schematic view of a junction portion of a second pixel and a data line of a liquid crystal display panel, according to a comparison example.
Figure 9:
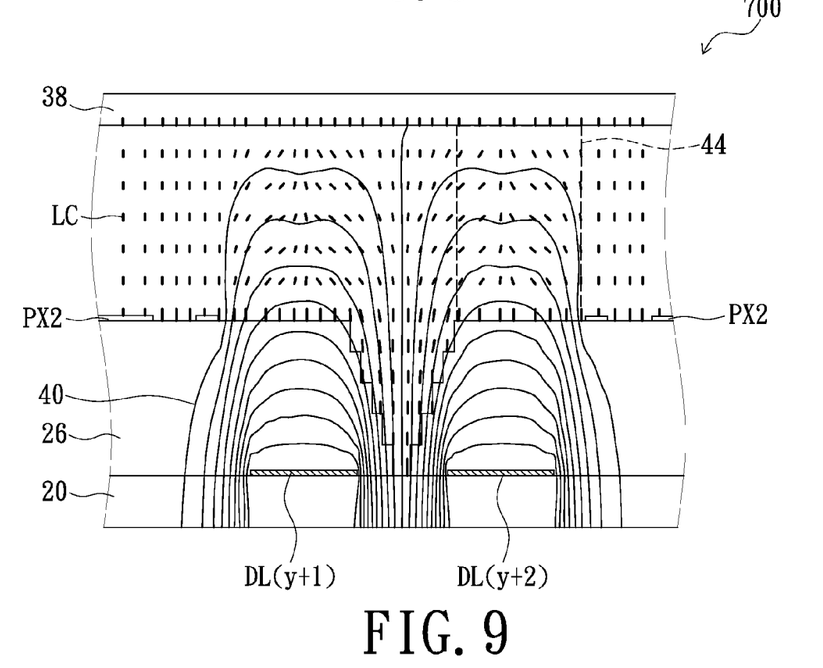
FIG. 9 is a cross-sectional schematic view of the liquid crystal display panel of FIG. 8, taken along line IV-IV'.

A comparison between one embodiment of the present invention and a comparison example will be made below, as an example, to describe advantages of the present invention. Referring to FIGS. 6 to 9, FIG. 6 is a distribution schematic view of a junction portion of a second pixel and a data line of a liquid crystal display panel according to a fifth embodiment of the present invention. FIG. 7 is a cross-sectional schematic view of the liquid crystal display panel of FIG. 6, taken along line III-III'. FIG. 8 is a distribution schematic view of a junction portion of a second pixel and a data line of a liquid crystal display panel according to a comparison example. FIG. 9 is a cross-sectional schematic view of the liquid crystal display panel of FIG. 8, taken along line IV-IV'.

Figure 6:
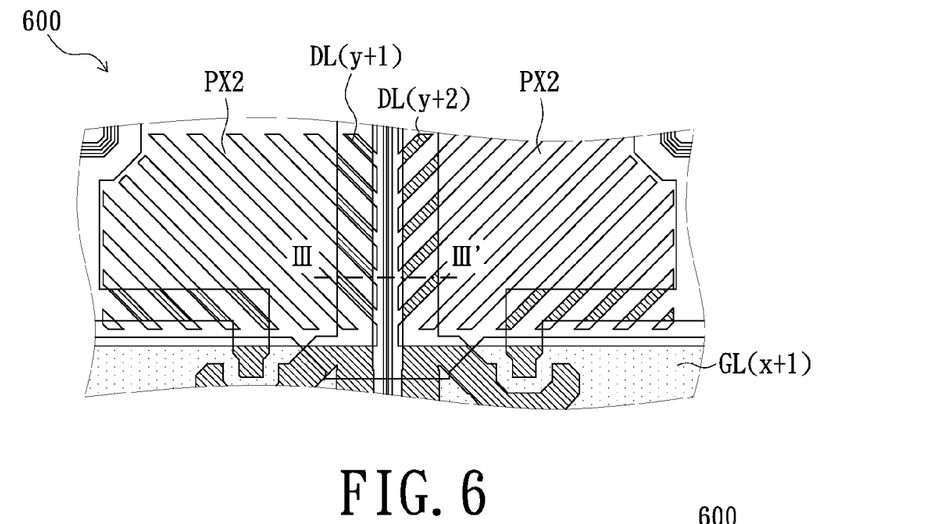
FIG. 6 is a distribution schematic view of a junction portion of a second pixel and a data line of a liquid crystal display panel, according to a fifth embodiment of the present invention.
Figure 7:
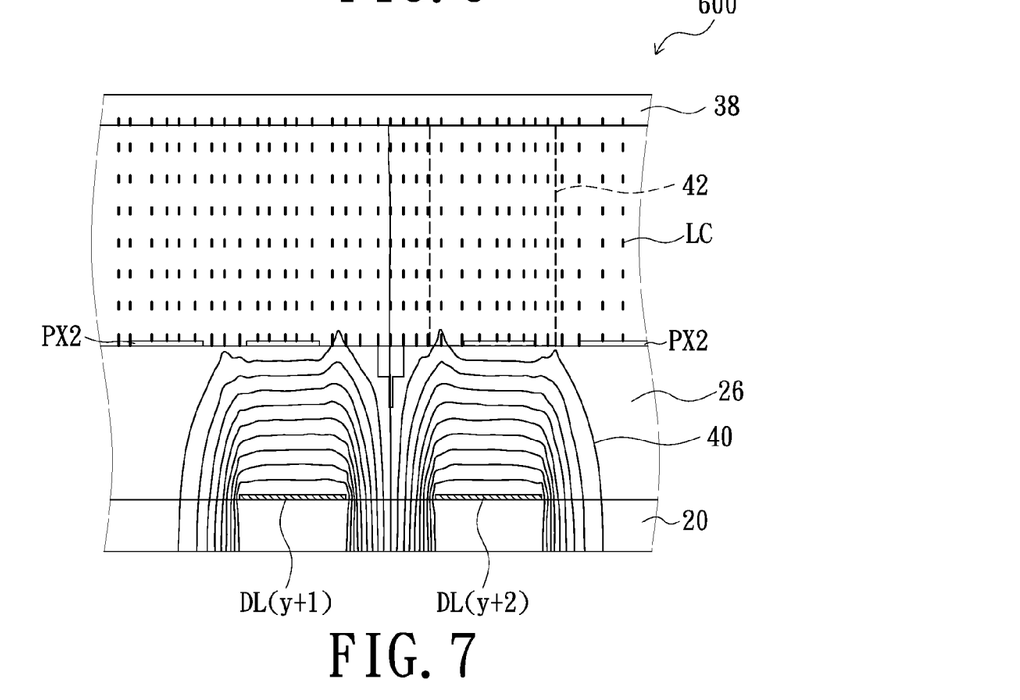
FIG. 7 is a cross-sectional schematic view of the liquid crystal display panel of FIG. 6, taken along line III-III'.

As shown in FIGS. 6 and 7, a liquid crystal display panel 600 of the fifth embodiment may include at least two data lines DL(y+1) and DL(y+2) disposed between adjacent pixel structures. A dielectric layer 26 may be positioned between the data lines DL(y+1) and DL(y+2) and a second pixel electrode PX2, and the dielectric layer 26 may include a color filter CF, a black matrix BM, a transparent organic material or combinations thereof. A substrate plate 38 may include the above substrate plate 30, a common electrode COM, a stabilization alignment polymer film 32 and a selective black matrix BM (not shown). For example, the liquid crystal display panel 600 may have a structure similar to that shown in FIG. 4B or 5B. In order to more clearly display the arrangement of liquid crystal molecules of a liquid crystal layer LC, FIG. 7 does not show the stabilization alignment polymer films, but actually, the liquid crystal display panel 600 may include above stabilization alignment polymer films 24 and 32 to achieve a better display effect.

According to the distribution of power lines 40 of the liquid crystal display panel 600 during operating, because the second pixel electrode PX2 of the present embodiment partially overlaps the adjacent data lines DL(y+1) and DL(y+2), the stabilization alignment polymer films disposed on the second pixel electrode PX2 can well control the liquid crystal molecules. Thus, the arrangement of liquid crystal molecules 42 located near the data lines DL(y+1) and DL(y+2) is not easily interfered by an electric field generated by the data lines DL(y+1) and DL(y+2). Therefore, the liquid crystal molecules 42 located near the data lines DL(y+1) and DL(y+2) also can be well controlled. That is, the liquid crystal molecules 42 may be aligned substantially perpendicular to the base substrate 20 and the substrate plate 38, and are not prone to undesired inclines, thus avoiding light leakages. Accordingly, the sub display region A2 of the present invention is not required to dispose black matrixes BM around to shield light, thereby efficiently increasing the aperture ratio.

COMPARISON EXAMPLE

As shown in FIGS. 8 and 9, the difference between the comparison example and embodiments of the present invention is that a second pixel electrode PX2 of a liquid crystal display panel 700 of the comparison example dose not overlap adjacent data lines DL(y+1) and DL(y+2). According to the distribution of power lines 40 of the liquid crystal display panel 700 during operating, an electric field generated by the data lines DL(y+1) and DL(y+2) of the comparison example easily interfere the arrangement of liquid crystal molecules 44 located near the data lines DL(y+1) and DL(y+2). Therefore, the liquid crystal molecules 44 located near the data lines DL(y+1) and DL(y+2) are prone to undesired inclines, thus leading to light leakages. To avoid this condition of light leakages, a black matrix BM should be disposed on the data lines DL(y+1) and DL(y+2) located around a sub display region of the comparison example, and the width of the black matrix BM should be larger at least 3 microns than total width of the data lines DL(y+1) and DL(y+2). Consequently, the aperture ratio may be decreased.

In summary, each first pixel electrode of various embodiments of the present invention is separated from the adjacent data lines, and each second pixel electrode partially overlaps the adjacent data lines. In the process of fabrication of the stabilization alignment polymer films, the arrangement of the liquid crystal molecules and the reactant monomer is controlled by using shapes of the pixel electrodes, therefore, the arrangement of liquid crystal molecules of a PSA liquid crystal display panel is nearly related to the shapes of the pixel electrodes. The present invention not only can well control the liquid crystal molecules located near the data lines, but also increase the aperture ratio. Therefore, the display effect of the liquid crystal display panel can be improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A polymer stabilization alignment liquid crystal display panel comprising:
   a first substrate plate;
   a plurality of gate lines disposed on the first substrate plate;
   a plurality of data lines disposed on the first substrate plate, and substantially perpendicular to the gate lines, the gate lines and the data lines cooperatively defining a plurality of pixel regions, each pixel region comprising at least a main display region and a sub display region;
   a dielectric layer positioned on the gate lines and the data lines;

a plurality of first pixel electrodes positioned in the main display region and on the dielectric layer, each first pixel electrode electrically connecting to the corresponding gate line and data line, and each first pixel electrode being separated from the adjacent data line and thereby forming a gap therebetween;

a plurality of second pixel electrodes positioned in the sub display region and on the dielectric layer, each second pixel electrode electrically connecting to the corresponding gate line and data line, each second pixel electrode comprising a plurality of branches and a plurality of slits, each slit being located between two adjacent branches, and the branches and the slits of each second pixel electrode partially overlapping the adjacent data line to form an overlap width;

a stabilization alignment polymer film covering the first pixel electrodes and the second pixel electrodes;

a black matrix disposed on the gap between each two of the adjacent first pixel electrodes, and not disposed on the overlap width between each two of the adjacent second pixel electrodes;

a second substrate plate positioned opposite to the first substrate plate; and a liquid crystal layer positioned between the first substrate plate and the second substrate plate.

2. The polymer stabilization alignment liquid crystal display panel as claimed in claim 1, wherein the gap between each first pixel electrode and the adjacent data line is in a range from 1 micron to 6 microns.

3. The polymer stabilization alignment liquid crystal display panel as claimed in claim 1, wherein a ratio of the gap to the width of each data line is in a range from 0.01 to 1.

4. The polymer stabilization alignment liquid crystal display panel as claimed in claim 1, wherein the overlap width of each data line and one of the adjacent second pixel electrodes is in a range from 1.5 microns to 8 microns.

5. The polymer stabilization alignment liquid crystal display panel as claimed in claim 1, wherein a ratio of the overlap width to the width of each data line is in a range from 0.01 to 1.

6. The polymer stabilization alignment liquid crystal display panel as claimed in claim 1, wherein an operating voltage of the main display region is larger than that of the sub display region.

7. The polymer stabilization alignment liquid crystal display panel as claimed in claim 1, wherein the dielectric layer comprises a color filter.

8. The polymer stabilization alignment liquid crystal display panel as claimed in claim 1, wherein the black matrix is positioned between the first substrate plate and the liquid crystal layer.

9. The polymer stabilization alignment liquid crystal display panel as claimed in claim 1, wherein the black matrix is positioned between the second substrate plate and the liquid crystal layer.

10. The polymer stabilization alignment liquid crystal display panel as claimed in claim 1, wherein the dielectric layer comprises a color filter, the black matrix, a transparent organic material or combinations thereof.

11. The polymer stabilization alignment liquid crystal display panel as claimed in claim 1, wherein each pixel region corresponds to one of the gate lines and two of the data lines.

12. The polymer stabilization alignment liquid crystal display panel as claimed in claim 1, wherein each pixel region corresponds to two of the gate lines and one of the data lines.

13. The polymer stabilization alignment liquid crystal display panel as claimed in claim 1, further comprising a first transistor and a second transistor, wherein a gate of the first transistor and a gate of the second transistor both electrically connect to one of the gate lines, and a source/drain of the first transistor and a source/drain of the second transistor both electrically connect to one of the data lines.

14. The polymer stabilization alignment liquid crystal display panel as claimed in claim 13, wherein the first pixel electrode electrically connects to the first transistor, and the second pixel electrode electrically connects to the second transistor.

15. The polymer stabilization alignment liquid crystal display panel as claimed in claim 1, wherein each of the branches has an edge, and at least one edge of the branches is substantially parallel to the data lines.

16. The polymer stabilization alignment liquid crystal display panel as claimed in claim 1, wherein each of the branches has a corner being substantially round.

17. A liquid crystal display panel comprising:
a first substrate plate;
a plurality of gate lines disposed on the first substrate plate;
a plurality of data lines disposed on the first substrate plate, and substantially perpendicular to the gate lines, the gate lines and the data lines cooperatively defining a plurality of pixel regions, each pixel region comprising at least a main display region and a sub display region;
a dielectric layer positioned on the gate lines and the data lines;
a plurality of first pixel electrodes positioned in the main display region and on the dielectric layer, each first pixel electrode electrically connecting to the corresponding gate line and data line, and each first pixel electrode being separated from the adjacent data line and thereby forming a gap therebetween;
a plurality of second pixel electrodes positioned in the sub display region and on the dielectric layer, each second pixel electrode electrically connecting to the corresponding gate line and data line, each second pixel electrode comprising a plurality of branches and a plurality of slits, each slit being located between two adjacent branches,
and the branches and the slits of each second pixel electrode partially overlapping the adjacent data line to form an overlap width;
a black matrix disposed on the gap between each two of the adjacent first pixel electrodes, and not disposed on the overlap width between each two of the adjacent second pixel electrodes;
a second substrate plate positioned opposite to the first substrate plate; and
a liquid crystal layer positioned between the first substrate plate and the second substrate plate.

18. The liquid crystal display panel as claimed in claim 17, wherein a ratio of the gap to the width of each data line is in a range from 0.01 to 1.

19. The liquid crystal display panel as claimed in claim 17, wherein a ratio of the overlap width to the width of each data line is in a range from 0.01 to 1.

20. The liquid crystal display panel as claimed in claim 17, wherein each of the branches has an edge, and at least one edge of the branches is substantially parallel to the data lines.

21. The liquid crystal display panel as claimed in claim 17, wherein each of the branches has a corner being substantially round.

22. A liquid crystal display panel comprising:
a first substrate plate;
a plurality of gate lines disposed on the first substrate plate;

a plurality of data lines disposed on the first substrate plate, and substantially perpendicular to the gate lines, the gate lines and the data lines defining a plurality of pixel regions, each pixel region comprising at least a main display region and a sub display region;

a dielectric layer disposed on first substrate plate and covering the gate lines and the data lines;

a plurality of first pixel electrodes disposed in the main display region, the first pixel electrodes being electrically connected to the gate lines and data lines correspondingly, and the first pixel electrode and the data lines adjacent thereto being separated from each other with a gap;

a plurality of second pixel electrodes disposed in the sub display region and on the dielectric layer, the second pixel electrodes being electrically connected to the gate lines and data lines correspondingly, each second pixel electrode comprising a plurality of branches and a plurality of slits, each slit being located between two adjacent branches, and the branches and the slits of each second pixel electrode partially overlapping the adjacent data line to form an overlap width;

a black matrix disposed on the gap between each two of the adjacent first pixel electrodes, and not disposed on the overlap width between each two of the adjacent second pixel electrodes;

a second substrate plate disposed opposite to the first substrate plate; and a liquid crystal layer disposed between the first substrate plate and the second substrate plate.

23. The liquid crystal display panel as claimed in claim 22, wherein the overlap width is in a range from 1.5 microns to 8 microns.

24. The liquid crystal display panel as claimed in claim 23, wherein a ratio of the overlap width to the width of the data line is in a range from 0.01 to 1.

25. The liquid crystal display panel as claimed in claim 22, wherein each of the branches has an edge, and at least one edge of the branches is substantially parallel to the data lines.

26. The liquid crystal display panel as claimed in claim 22, wherein each of the branches has a corner being substantially round.

* * * * *